US012278813B2

(12) United States Patent
Piel

(10) Patent No.: US 12,278,813 B2
(45) Date of Patent: *Apr. 15, 2025

(54) SYSTEM ARCHITECTURE AND DATABASE FOR CONTEXT-BASED AUTHENTICATION

(71) Applicant: MASTERCARD INTERNATIONAL INCORPORATED, Purchase, NY (US)

(72) Inventor: Brian Piel, Ballwin, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/687,279

(22) Filed: Mar. 4, 2022

(65) Prior Publication Data

US 2022/0191198 A1    Jun. 16, 2022

Related U.S. Application Data

(63) Continuation of application No. 16/025,851, filed on Jul. 2, 2018, now Pat. No. 11,271,930.

(51) Int. Cl.
  H04L 29/06    (2006.01)
  H04L 9/40     (2022.01)
  G06Q 20/40    (2012.01)
(52) U.S. Cl.
  CPC ........ H04L 63/0861 (2013.01); H04L 63/102 (2013.01); H04L 63/105 (2013.01); H04L 63/20 (2013.01); G06Q 20/4014 (2013.01)
(58) Field of Classification Search
  CPC . H04L 63/0861; H04L 63/102; H04L 63/105; H04L 63/20; G06Q 20/4014
  See application file for complete search history.

(56) References Cited

U.S. PATENT DOCUMENTS 7,707,089 B1    4/2010  Barton et al.
8,769,127 B2*   7/2014  Selimis ................... H04L 67/75
                                                709/227

(Continued)

FOREIGN PATENT DOCUMENTS

WO    2014176539 A1    10/2014
WO    2018063583 A1     4/2018

OTHER PUBLICATIONS

PCT International Search Report and Written Opinion, Application No. PCT/US2019/039684, dated Aug. 21, 2019, 9 PPS.

*Primary Examiner* — Shin-Hon (Eric) Chen
*Assistant Examiner* — Vladimir I Gavrilenko
(74) *Attorney, Agent, or Firm* — Armstrong Teasdale LLP

(57) ABSTRACT

An authentication correlation (AC) computing device is provided. The AC computing device includes a processor and a memory. The AC computing device receives a first authentication request from a requesting computer device including an account identifier, a first timestamp, and at least one authentication factor, and determines a first security level of the first authentication request. The AC computing device stores the first security level and the first timestamp. The AC computing device is also configured to receive a second authentication request including the account identifier and a second timestamp, determine that the second authentication request satisfies an authentication rule based on the account identifier, the second timestamp, and the stored authentication data wherein the rule defines a timeframe and an authentication threshold, and generate an authentication response based on the determination and the authentication rule wherein the authentication response includes an approval indicator.

20 Claims, 6 Drawing Sheets

(56) References Cited

U.S. PATENT DOCUMENTS

| | | |
|---|---|---|
| 9,471,920 B2 | 10/2016 | Kolkowitz et al. |
| 9,569,775 B2 | 2/2017 | Fisher |
| 9,600,819 B2 | 3/2017 | Wiesman |
| 10,015,171 B1 | 7/2018 | Vardy |
| 10,257,205 B2 * | 4/2019 | Mathew .............. G06F 21/6218 |
| 11,271,930 B2 * | 3/2022 | Piel ........................ G06Q 20/40 |
| 11,356,259 B1 * | 6/2022 | Agnew ................. H04L 9/3271 |
| 2009/0037995 A1 * | 2/2009 | Zapata .................... G06F 21/43 |
| | | 726/9 |
| 2014/0201809 A1 | 7/2014 | Choyi |
| 2015/0012430 A1 | 1/2015 | Chisolm et al. |
| 2015/0347734 A1 * | 12/2015 | Beigi .................... H04L 9/3268 |
| | | 726/28 |
| 2016/0086182 A1 | 3/2016 | Howe |
| 2016/0098710 A1 | 4/2016 | Suen et al. |
| 2017/0195429 A1 * | 7/2017 | Bokare .............. H04L 63/0815 |
| 2017/0300911 A1 | 10/2017 | Alnajem |
| 2018/0034858 A1 | 2/2018 | Gummaraju |
| 2018/0191695 A1 | 7/2018 | Lindemann |
| 2018/0191700 A1 | 7/2018 | Kong |
| 2018/0359233 A1 | 12/2018 | Alexander |
| 2020/0068391 A1 | 2/2020 | Liu |

\* cited by examiner

SYSTEM ARCHITECTURE AND DATABASE FOR CONTEXT-BASED AUTHENTICATION

CROSS-REFERENCE TO RELATED APPLICATIONS

This application is a continuation application of U.S. patent application Ser. No. 16/025,851, filed Jul. 2, 2018, the entire contents of which are hereby incorporated by reference in their entirety.

BACKGROUND

This disclosure relates generally to electronic systems for authenticating users, and more specifically to network-based systems and methods for authenticating network users by using previous multifactor authentications when processing current authentication requests.

Users of computer networks oftentimes have to be authenticated before the user is able to access certain secure data or before the user is able to perform a task within the computer network. To authenticate such users, some computer systems will request and review authentication factors that may be provided by the user. Verifying authentication factors is specially resource intensive when attempting to prevent brute force attacks and/or other attacks on the network. This use of computer resources leads to increases in processing time for requests, system complexity, and costs for specialized equipment (e.g., encryption acceleration hardware). For example, certain computer processors provide a separate instruction interface (e.g., an AES, Advanced Encryption Standard, instruction set) to encryption specialized hardware (e.g., a BROADCOM® Security Processor). It may be impractical for businesses to transition all request processing to this specialized hardware to avoid delays. Therefore, there is a need for a system that provides the security of multifactor authentication without excessive use of computational resources or redundant authentication requests.

Moreover, repeatedly requesting multifactor authentication from users may decrease the security of a system. For example, repeatedly transmitting a password or security token over a network may increase the likelihood of the authentication factor being compromised. Furthermore, in some cases, users may avoid utilizing systems that require redundant authentication requests due to inconvenience or delay. Therefore, there is a need for a system that users would more likely utilize that maintains security while reducing time spent responding to such authentication challenges.

At least some known systems may not correlate between multiple types of authentication, such as payment processing systems and web portal login systems. For example, a payment processing system and a portal login system may be associated with the same account. However, the combined authentication history may not be leveraged when processing incoming requests. These known systems may provide reduced security, increase the likelihood of fraud, increase time spent processing authentication factors, and require users to complete redundant authentications. A system is needed that is able to authenticate a network user by leveraging previous authentications for current authentication requests.

BRIEF DESCRIPTION

In one aspect, an authentication correlation (AC) computing device is provided. The AC computing device includes at least one processor and a memory. The AC computing device receives a first authentication request from a requesting computer device including an account identifier, a first timestamp, and at least one authentication factor, and determines a first security level of the first authentication request. The AC computing device stores the first security level and the first timestamp. The AC computing device is also configured to receive a second authentication request including the account identifier and a second timestamp, determine that the second authentication satisfies an authentication rule based on the account identifier, the second timestamp, and the stored authentication data wherein the rule defines a timeframe and an authentication threshold, and generate an authentication response based on the determination and the authentication rule wherein the authentication response includes an approval indicator.

In another aspect, a computer-implemented method for context-based authentication is provided. The method is implemented using an authentication correlation (AC) computing device that includes at least one processor and a memory in communication with the processor. The method includes receiving a first authentication request from a requesting computer device including an account identifier, a first timestamp, and at least one authentication factor, determining a first security level of the first authentication request based upon the at least one authentication factor, and storing the first security level and the first timestamp in a database as authentication data. The method further includes receiving a second authentication request including the account identifier and a second timestamp, determining the second authentication satisfies an authentication rule based on the account identifier, the second timestamp, and the stored authentication data wherein the rule defines a timeframe and an authentication threshold, and generating an authentication response based on the determination and the authentication rule wherein the authentication response includes an approval indicator.

In another aspect, a non-transitory computer readable medium that includes computer executable instructions for context-based authentication is provided. When executed by an authentication correlation (AC) computing device having at least one processor and a memory in communication with the processor, the computer executable instructions cause the AC computing device to receive a first authentication request from a requesting computer device including an account identifier, a first timestamp, and at least one authentication factor, determine a first security level of the first authentication request based upon the at least one authentication factor, and store the first security level and the first timestamp in a database as authentication data. The computer executable instructions further cause the AC computing device to receive a second authentication request including the account identifier and a second timestamp, determine that the second authentication request satisfies an authentication rule based on the account identifier, the second timestamp, and the stored authentication data wherein the rule defines a timeframe and an authentication threshold, and generate an authentication response based on the determination and the authentication rule wherein the authentication response includes an approval indicator.

DETAILED DESCRIPTION

Figure 1:
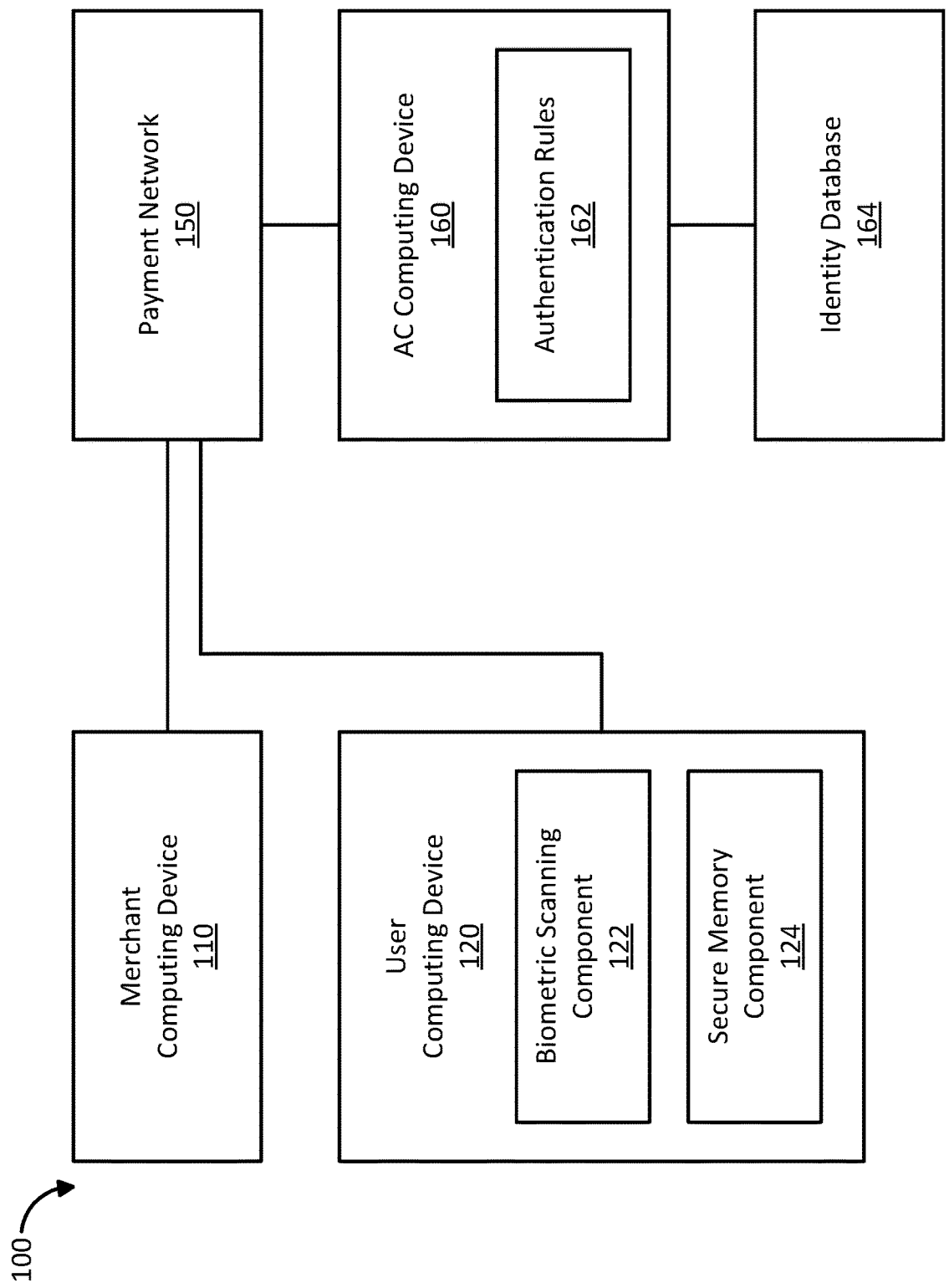
FIG. 1 is a schematic diagram illustrating an exemplary authentication correlation computer system for processing online user authentication requests.

The following detailed description illustrates embodiments of the disclosure by way of example and not by way of limitation. The description enables one skilled in the art to make and use the disclosure, describes several embodiments, adaptations, variations, alternatives, and uses of the disclosure, including what is presently believed to be the best mode of carrying out the disclosure.

The systems and methods of the disclosure allow for authentication requests, such as requests to authenticate or verify the identity of a user attempting to login to a website or to initiate a network-based payment transaction, to be correlated across multiple secure computer systems based on a level of security and the time of the authentication. Such correlation may be especially desirable to reduce the time and computing resources required to securely authenticate a user, and prevent repetitive authentications. As used herein, authentication means the process by which the identity of an online user is verified. In other words, it is the process used to verify that an online user (sometimes referred to as a "candidate user") is the legitimate user having authority to perform the task that the candidate user is attempting to perform. Authorization is also described herein. Authorization, as used herein, means the process used as part of an online or "brick and mortar" payment transaction where the merchant verifies that the payment card being used is valid and that the cardholder has sufficient funds to cover the purchase.

As part of the payment process, the online user may undergo both an authentication process (e.g., verifying that the user is the legitimate cardholder with granted authority to use the payment card in a payment transaction), and an authorization process (e.g., confirming that the cardholder has sufficient funds to cover the purchase). As further used herein, correlation means relating or comparing received authentication requests to previous authentication requests, such that authentication rules may be applied to a currently received authentication request based on the previous authentication requests. In other words, current authentication requests may be correlated to previous authentication requests to satisfy authentication rules.

The benefits of authentication to data providers, such as payment card issuers, merchants, or payment processors, are increasingly recognized to prevent digital identity fraud. However, the necessarily complex authentication process may become burdensome to end users. Additionally, many data providers provide multiple services each including user authentication. For example, a data provider may authenticate both payment card transactions and network logins. Therefore, as explained herein, overall security may be enhanced using the systems and methods described herein, in addition to reducing processing time, by correlating authentications across multiple systems.

Additionally, authentications may include any number of authentication factors, such as passwords, biometrics, unique tokens, and the like. A multifactor authentication is used to mitigate the risk of loss due to the compromise of a single authentication factor. However, multifactor authentications may have an increased processing cost and further may inconvenience users who are expected to coordinate multiple steps to authenticate. Overall, there is a need to balance multifactor authentications with limited processing resources.

At least one of the benefits of the systems and methods described herein is the ability to use successful multifactor authentications from historical authentication requests, for approving a current authentication request if certain rules are satisfied and, by so doing, reducing the need for additional authentication factors in subsequent requests, and reducing the processing time and network usage associated with the subsequent requests. Additionally, the systems and methods described herein address the problem of users rejecting systems that require multiple time-consuming authentications within a short timeframe. For example, as described herein, the AC system may only require a user to enter a pin code to verify a current transaction after an earlier transaction that required a verification using their fingerprint.

The systems and methods described herein relate to an authentication correlation (AC) system. The AC system is configured to approve authentication requests associated with performing a network based payment transaction without a multifactor authentication if the current payment transactions are within a specific timeframe of a previous authentication with a high security level (e.g., multiple trusted security factors). To address the problem of low tolerance for delays in authentication processes, the AC system is configured to correlate authentication factors between authorization (e.g., payment) requests, including correlating based on timestamps included in the authentication requests, so that authentication can still be performed to reduce fraudulent transactions while also reducing time delays for users.

As used herein, authorization request may refer to an electronic request for access to a secure computer system, including a secure database. In other embodiments, authorization requests may be part of processing payment card transactions over a payment processing network. The authorization request may be formatted as a network message specifically formatted for transmission over a transaction processing network (e.g., MASTERCARD®, VISA®, etc.), for example, an ISO8583 message. Additionally or alternatively, authorization requests may include API requests to access account data. In certain embodiments, authorization requests may include any number of authentication requests that are used for authenticating the user as the legitimate cardholder or accessor of data.

As used herein, authentication request is a request to verify the authenticity of the user submitting the request, such as verifying the origin of the request. In one embodiment, where requests include a user identifier, authenticating a request may include determining the request was property generated and/or authorized by the identified user. Specifically, the identity of the requestor may be verified based on trusted data included in the request, such as a password, fingerprint data (or other biometric data), or PIN. For example, a user may make a login request to access a website from a web server, wherein the login request includes an authentication request (e.g., username and password).

In other words, authorization requests may also include authentication requests. For example, a request to access secure data (e.g., authorization request) may include an authentication request (e.g., password). In one example of the AC system, a first authorization request may be received that includes a first authentication request, or the first authentication request may be received first by the AC system and if authenticated then a first authorization request is received. The first authentication request may be filtered out from the first authorization request, and stored in a database as being associated with the first authorization request. Then, a second authorization request may be received, where the second authorization request may not include or may not be paired with an authentication request. For example, the second authentication request may include a user identifier and/or an account identifier. The second authentication request may be verified by correlating it to the first authentication request. For example, the second authentication request and the first authentication request may have been generated by the same device within a relatively short time span (e.g., 15 minutes, 1 hour). By using the result of the first authentication request in combination with the elapsed time span, the AC provides additional confirmation to the authorizing party that the user is the legitimate user without having to further authenticate the user.

The present disclosure relates to an authentication correlation (AC) system for authenticating a user and, more particularly, a system for authenticating a user based on authentication factors included in previous authentication requests. In at least some embodiments, the AC system includes at least one AC computing device and at least one authentication factor database. In one embodiment, the authentication factor database and the AC computing device are components of a server system. The server system may include a single server device, a network of multiple computer devices, a virtual computing device, or the like. In some embodiments, the AC computing device is in communication with a payment network configured to process payment card transactions, wherein the payment network includes at least a merchant computing device and an issuer computing device.

In certain embodiments, the AC computing device is configured to generate responses to authentication requests based on authentication factors included in previous requests. For example, after approving an authentication request (e.g., and possibly a paired authorization request) that includes fingerprint data and an account identifier, the AC computing device may approve subsequent requests based only on the account identifier if certain authentication rules are satisfied. In other words, after a multifactor authentication, the AC computing device may require less authentication factors in subsequent requests, based on correlating the subsequent authentication requests to stored authentication factor data. In one embodiment, the AC computing device is part of a payment processor, which is part of a payment processing network. In another embodiment, the AC computing device is separate from the payment processor, but is in communication with the payment processor.

In one embodiment, the AC system is associated with a payment network configured to process payment transactions. The payment network includes at least a merchant device, an acquiring bank device, the payment processor, and the issuer bank device in communication and configured to process authentication and authorization request messages between these parties. The payment network may also include a web server providing a secure user interface to access payment account information, such as account balances and recent transactions. In certain embodiments, a user may be required to provide an authentication factor, such as a password or security question answer, to access the secure user interface.

The payment network may also include a merchant interface for processing point of sale ("POS") device transactions and online web transactions, such as authorization messages associated with payment card transactions. For example, an authorization request message, initiated as part of a payment transaction with the merchant, may include a merchant identifier, a cardholder account identifier, and a transaction amount. In certain embodiments, the payment network is configured to approve or decline authorization messages based not only on the transaction amount and the account identifier, but also on the likelihood of fraud. For example, the payment network may determine if the authorization message is consistent with previous transactions associated with the account number. For example, an authorization message may be declined, despite funds being available, if the merchant where the transaction is being initiated is in a significantly different geographic location than previous transactions.

In one embodiment, authorization requests include authorization messages associated with a payment network, such as an authorization to process a payment transaction based on a payment card and/or virtual payment card. Additionally or alternatively, authorization requests include login requests associated with a webserver, such as a cardholder portal or merchant website.

The AC system is configured to authenticate users based on authentication factors included in authentication requests. For example, the AC computing device may determine an authentication request includes two authentication factors indicating a high security level, referred to as two factor authentication ("2FA"). Authentication factors refer to input characteristics used to verify that an authentication request is properly associated with a user. For example, where an authentication request includes a username and password, the AC system may verify the request originated with the identified user based on the password. As another example, an authentication request may include a payment card identifier and a PIN code, where the payment card identifier and the PIN code are each authentication factors.

In certain embodiments, the AC system is configured to categorize authentication requests based on the type of authentication factors included. Authentication factors include possession factors, knowledge factors, and inherence (e.g., biometric) factors. Possession factors include an input characteristic provided by the user, such as a trusted mobile device, payment card, and the like. Knowledge factors include input characteristics input by the user, such as passwords, passcodes, and PINs. Inherence (e.g., biometric) factors refer to input characteristics such as fingerprint data, and facial geometry data. For example, inherence factors may include a hash value generated based on a fingerprint scan performed using a user device.

In some embodiments, authentication factors include indicators of a type of authentication that was performed. For example, an authentication request may include an indicator that fingerprint authentication (e.g., inherence factor) was used, without specifically including fingerprint data. In certain embodiments, authentication requests may include zero authentication factors. In some embodiments, where merchants process card-on-file reoccurring payment card transactions, the reoccurring payment card transactions may not include authentication factors such as an indicator that a payment card was presented and/or a pin code.

Additionally or alternatively, the AC system may also utilize an risk-based decisioning (RBD) component to determine whether a step-up challenge is needed for authentication purposes. In other words, authentication may be performed in some cases without the stepped-up challenge as described herein. For example, the RBD component may identify one or more pieces of information about a payment transaction that are used to "score" the transaction for risk (e.g., potential fraud). More specifically, the RBD component may score the payment transaction based on several aspects including device information, and account information associated with the transaction. Device information may include information about the computing device used during the payment transaction, such as a unique hardware identifier, or an IP address associated with the device, etc. Account information may include information about the account being used, such as dates of use, name on the account or address associated with the account, etc. In one embodiment, the RBD component generates a risk score for the payment transaction based on the device information and/or account information used for the transaction. The RBD component may then send the score and/or risk-based decisioning data to an issuer's ACS (access control system) for further consideration. Using this score and/or risk-based data, the issuer's ACS may then determine whether or not the suspect consumer should be further authenticated (e.g., through the 3DS "step-up" challenge) or whether the transaction can be verified without further challenges.

One authentication protocol is known as 3-D Secure® (3DS). 3DS is used by merchants and acquirers to authenticate transactions before they proceed to authorization. In at least one implementation, to authenticate a transaction, the merchant at which the transaction is initiated generates a "web call" or Internet-based message (e.g., an XML-formatted message) to "call" or activate the 3DS protocol. This 3DS web call includes data elements associated with the initiated transaction, such as a merchant identifier and transaction amount, as well as authentication data elements (e.g., cardholder information, device information, digital wallet information, location information, etc.) that facilitate authentication of the cardholder. The 3DS web call is transmitted by the merchant to the 3DS provider, which may include a third party, the issuer, and/or the transaction processing network. If the authentication is successful, the 3DS provider generates a 3DS web response (e.g., an XML-formatted message) including an Accountholder Authentication Value (AAV) that indicates the authentication was successful. The 3DS web response is transmitted to the issuer and back to the merchant. Only then does the merchant generate and transmit the authorization request. In other words, the merchant is generating and transmitting two separate messages in series, which can add to transaction processing time. Especially for very large online merchants (e.g., Google®, Amazon®), this additional message can add a great deal of time and processing requirements.

In some embodiments, where the AC system is coupled to a payment network configured to process payment card transactions, authorization requests may include or be paired with authentication requests associated with payment transactions. In one embodiment, authorization request refers to a request generated by a merchant based on a payment card or payment card identifier, and transmitted to the payment network. For example, a user may present a physical payment card to a merchant to pay an invoice of $150, and the merchant may transmit an authorization request message along with an authentication request message for $150 to the payment network. Alternatively, a user may present a mobile device that includes a virtual payment card to initiate the $150 payment transaction. In this example, the presented payment card (e.g., on the mobile device) is an authentication factor, specifically a possession factor. In other words, the transaction is approved based in part on the knowledge that the user presented a valid payment card.

For example, an authorization request and an authentication request may be generated and transmitted to a payment network when a user swipes a payment card at a merchant payment terminal (e.g., merchant computing device). In some embodiments, payment transaction request messages include both an authorization request message and an authentication request message associated with a payment network processing payment card transactions.

In certain embodiments, authentication factors may include indicators of authentication processes completed on a user device (e.g., local authentication, on-device authentication). In other words, a mobile device may be configured to check a fingerprint locally, and transmit an indicator of the successful check. In some embodiments, virtual payment card data is stored within a secure memory component of a user computing device (e.g., smartphone), such that the secure memory component may not be arbitrarily written to. In certain embodiments, the secure memory component is connected to a biometric scanning component, such as a fingerprint reader or a camera system configured to capture face geometry. In one embodiment, the user computing device is configured to scan a fingerprint, compare the fingerprint to a representation (e.g., hash value, partial model) of a trusted fingerprint stored in the secure memory component, and generate authentication factor data based on private key data included in the secure memory component, wherein the authentication factor data includes an indicator that fingerprint authentication was performed and an indicator (e.g., digital signature) that a trusted device generated the authentication factor data. Additionally or alternatively, the biometric scanning component may be configured to scan and generate a mathematical model of a facial structure using a camera system.

For example, a user may unlock a smartphone with a fingerprint, where the smartphone compares the input fingerprint to a stored trusted fingerprint, and subsequently initiate a payment card transaction with a merchant using a virtual payment card stored on the smartphone. In response to the virtual payment card, the merchant may generate and transmit an authentication request to a payment processor, where the request includes three authentication factors: (i) a device signature, (ii) a payment card identifier, and (iii) an indicator that the user's fingerprint was verified by the smartphone.

In certain embodiments, authentication requests further include transactions initiated online. In one embodiment, a user may enter a payment card number and a verification number, where the verification number is an authentication factor indicating possession of the payment card associated with the payment card number. In another embodiment, a user may initiate a payment transaction online where the authentication request includes device data, such as a device identifier or device signature. For example, an authentication request may be cryptographically signed using a digital signature associated with a smartphone, indicating the request is associated with a specific device. The digital signature may be an authentication factor, indicating the possession of a known/trusted mobile device. For example, a user may purchase a movie on their smartphone, and the purchase may be approved based on a digital signature indicating the movie was purchased on a device known to be associated with the user.

Portal logins refer to an additional type of authentication requests, where a user is attempting to access payment account information, such as account balances and recent transactions. In one embodiment, a user may authenticate to the portal using a username and password (e.g., knowledge factor). In another embodiment, the user may authenticate to the portal using a one-time password ("OTP") received or generated by a mobile device. For example, when a user attempts to access the web portal using a new laptop, the user may be prompted for an OTP transmitted to their smartphone, to authenticate the user based on a possession factor. In other words, a request from a user using an unknown second device may be authenticated using a first known device, indicating the user of the second device is trusted based on their possession of the first device.

The AC computing device is configured to aggregate and store authentication factors, where the stored authentication factors are used to generate authentication responses in the correlation phase. In some embodiments, the AC computing device generates aggregated factor data based on authentication factors included in the authentication requests. In other words, the AC computing device is configured to aggregate a multitude of authentication requests into a database, such that the factor data may be retrieved based on an account identifier. In one embodiment, the AC computing device stores the aggregated factor data in a database indexed by account identifiers. Additionally or alternatively, the AC computing device may store the aggregated factor data in a memory, where the memory is an integral component of the AC computing device.

In one embodiment, the AC computing device receives a request to access a web portal (e.g., an authorization request) from a user computing device, including a username and a password (e.g., an authentication factor). In another embodiment, the AC computing device receives an authentication request paired with an authorization request from a merchant computing device including a payment card security code (e.g., an authentication factor) indicating the payment card was present for the transaction. In yet another embodiment, the AC computing device receives an authentication request from a user computing device, including a device signature (e.g., an authentication factor) indicating a virtual payment card was used and that a known/trusted user device was used.

The AC computing device is configured to parse any number of authentication factors from received authentication requests. Authentication factors include, at least, knowledge factors, possession factors, and inherence factors. For example, the AC computing device may determine an authentication request includes any combination of device identifiers, passwords, pin codes, biometric identifiers, device signatures, OTP values, and the like. In one embodiment, the AC computing device determines an authentication request includes two authentication factors, a device signature (e.g., possession factor), and an indicator the fingerprint of the user was checked by the device (e.g., inherence factor). In another embodiment, the AC computing device determines a login request associated with a web portal includes a password (e.g., knowledge factor).

The AC computing device is configured to determine a first security level of authentication requests based on included authentication factors. For example, an authentication request including a PIN code and an indicator of fingerprint authentication may be determined to have a high security level. As another example, an authentication request including only an account number may be determined to have a low security level. In certain embodiments, the security level may include any of authentication score, a risk score, and/or a trust score. For example, authentication requests may be scored on a range from 0 to 100 based on the included authentication factors. In another embodiment, the security level may be an indicator of multifactor authentication.

The AC computing device is further configured to determine any number of users and/or accounts associated with the authentication request. In one embodiment, the AC computing device is configured to determine an account identifier based on a payment card identifier or virtual payment card identifier included in an authentication request. In another embodiment, the AC computing device is configured to determine an account identifier based on a username included in a login request. In other words, the AC computing device may correlate a username to an account number. In certain embodiments, the AC computing device may determine any number of users associated with an authentication request. For example, the AC computing device may determine an authentication request is associated with an account having multiple authorized users (e.g., a joint account), and that the request is further associated with a specific user. For example, the AC computing device may determine a user identifier based on the specific payment card used with the account. In another example, the AC computing device may determine a login request username is associated with multiple account identifiers, such as personal and business accounts.

The AC computing device is configured to generate and store authentication factor data based on authentication requests and paired authorization requests. In other words, the AC computing device maintains a history of authentication factors and authentication levels. More specifically, the AC computing device is configured to store parsed authentication factors in an identity database. In some embodiments, the AC computing device generates an authentication record in response to an authentication request, such that the result of each authentication request is stored. In one embodiment, the AC computing device creates a record in the database, wherein the record includes an account identifier, a timestamp, and aggregated factor data. For example, after receiving an authentication request including a password, the AC computing device may store a record in the database including a timestamp, an account identifier, and an indicator that a knowledge authentication factor was provided. Additionally or alternatively, the record may include a user identifier, and an indicator a password was used.

In certain embodiments, the AC computing device is configured to store aggregated factor data in a hashed and/or encrypted format. For example, the AC computing device may store a hash value of a fingerprint or an encrypted device identifier, such that a record of authentication factors is maintained without storing the original aggregated factor data. In other embodiments, the AC computing device stores indicators of the types of authentication factors received in an authentication request. For example, in response to receiving an authentication request including fingerprint data, the AC computing device may store a record including a timestamp, where the record indicates the user authenticated using a biometric (e.g., inherence) factor.

The AC computing device is configured to generate authentication responses based on the stored aggregated factor data. Specifically, the AC computing device is configured to correlate received authentication requests to stored aggregated factor data, where the authentication requests and the stored aggregated factor data are associated by having the same user and/or account. In other words, the AC computing device approves/declines authentication requests based on authentication factors from previous requests. For example, the AC computing device may approve a second authentication request including a payment card number based on a first authentication request including a payment card number and indicator of biometric verification. In other words, authentication requests having a lower security level may be approved based on previous authentication requests associated with the same account having a higher security level.

The AC computing device is configured to generate authentication responses based on authentication rules, where the stored authentication rules indicate conditions for approving or declining an authentication request. In some embodiments, the authentication rules are stored in a memory, where the memory is an integral component of the AC computing device. Additionally or alternatively, the authentication rules may be stored in and accessed from a database, such as the identity database.

In some embodiment, authentication rules include a timeframe and a security level threshold. In certain embodiments, the timeframe is used to limit (e.g., filter) authentication factor data, such that only recent authentication factors are retrieved. For example, a timeframe may include selecting authentication factor data including a stored timestamp within two hours of a received timestamp. In other words, only recent authentication factors may be considered when evaluating an authorization request. In one embodiment, an authentication rule includes an integer configured such that, when subtracted from a UNIX timestamp, the result is a second UNIX timestamp defining a lower limit for authentication factor data. For example, the AC computing device may be configured to select only authentication factor data from the identity database having a timestamp greater than the second UNIX timestamp. In another embodiment, the timeframe includes a number of days, hours, etc., of previous authentication factors to be selected. The security level threshold includes a security level, and/or a number of security levels. For example, the security level threshold may define a minimum security level, where the security level includes a risk score, and/or the security level threshold may define a set of security levels, where the security level includes indicators of authentication types. In other words, the AC computing device is configurable to require different levels of authentication before approving an authentication request.

In some embodiments, authentication rules further include a scope specification indicating the authentication messages subject to the rule. In one embodiment, scope specification includes an issuer identification number ("IIN"), indicating an account number prefix associated with an account issuer. For example, an authentication rule may specify an IIN of "1234" such that the scope includes account identifiers such as "12340808 . . . " and "12340520 . . . " In another embodiment, scope specification includes a range or set of account identifiers. In some embodiments, scope specification includes a domain associated with usernames, such that the domain "doe" is associated with usernames including "john@doe.com" and "DOE\jane." In yet another embodiment, scope specification may include a range or set of merchant identifiers, where merchant identifiers are included in the authentication request. For example, scope specifications may include specifying authentication requests originating internationally, or only authorization requests including a payment request over a certain threshold.

The AC computing device is configured to match incoming authentication requests to at least one authentication rule based on scope specifications included in the authentication rules. In other words, the AC computing device determines any authentication rules applicable to an authentication request. In one embodiment, the AC computing device matches authentication requests to authentication rules based on an issuer identification number ("IIN"). For example, authentication rules may be associated with a payment card issuer. As another example, the AC computing device may process authentication requests associated with multiple web portals, and authentication rules may be applicable to requests to a specific web portal. In yet another embodiment, the AC computing device is configured to match authentication rules based on the origin of an authentication request. For example, the AC computing device may determine an authentication request includes an origin country identifier, and may match the authentication request to an authentication rule for international requests.

The AC computing device is configured to retrieve associated authentication factor data based on the authentication rules. More specifically, the AC computing device retrieves authentication factor data based on a timeframe included in the authentication rules, and an account identifier included in the authentication request. In other words, the AC computing device retrieves recent authentication requests associated with the same account (e.g., payment card, web login) as the authentication request. In one embodiment, the AC computing device transmits a SQL query to the identity database, where the SQL query is configured to select authentication factor data having the account identifier, and further to filter the selected authentication factor data based on the timeframe. The SQL query is also configured to return authentication factor data including any number of security levels. In other words, the AC computing device retrieves recent security levels. For example, the SQL query result may indicate three authentications within the past day, one of which included fingerprint authentication.

In certain embodiments, the AC computing device is configured to approve authentication requests based on previously stored authentication factors. In one embodiment, the AC computing device is configured to approve an authentication request not including an authentication factor, based on a recent authentication request that included multiple authentication factors. In other words, the AC computing device may lower the authentication standard for authentication requests, based on authentication factors included in previous requests. For example, where a first authentication request includes a fingerprint authentication indicator, a second request including no factors and received three hours later may be approved. In another example, where no authentication requests having at least one authentication factor associated with an account have been approved, an authentication request associated with the account may be declined.

The AC computing device is configured to compare authentication rules to retrieved aggregated factor data and authentication requests, and to generate authentication responses based on the comparison. In other words, the AC computing device determines if the authentication rule is satisfied by the authentication factor data and the authentication request.

The AC computing device is configured to generate authentication responses based on the comparison of the retrieved aggregated factor data to the authentication rules. In some embodiments, authentication responses include a status indicator, a timestamp, and the account identifier from the authentication request. In one embodiment, the status indicator includes a HTTP status code (e.g., not found 404, forbidden 403). In another embodiment, the status indicator includes an explicit indicator of if the authorization was authenticated (e.g., approved). In one embodiment, where an authentication request is associated with a payment transaction, the AC computing device may transmit a corresponding authentication response to a payment network and/or a merchant computing device. In another embodiment, where an authentication request is associated with a web portal, the AC computing device may transmit an authentication response to the web portal. For example, the AC computing device may transmit a HTTP API call to the web portal, including the authentication response.

In some embodiments, the authentication response is sent to the requesting user device that transmitted the authentication request. Additionally or alternatively, the AC computing device may transmit the authentication to a third computer system based on the authentication response, such as a payment network or a web server providing a web portal. In one embodiment, where the authentication request is associated with a web portal, the AC computing device may transmit a HTTP response to a server providing the web portal, such that the authentication response allows a user access to the web portal. In another embodiment, where the authentication request is associated with a payment card transaction, the AC computing device may transmit an authentication response over a payment card network, such that a payment card transaction is approved. In some embodiments, the AC computing device processes authentication requests including payment card transactions, and web portal logins.

In certain embodiments, the AC computing device is configured to generate authentication responses further including an authentication URI (e.g., URL, URN). In some embodiments, where the AC computing device generates an authentication response declining an authentication request, the authentication response includes the URI of an authentication system associated with the account identifier. In one embodiment, the authentication URI includes an address of an authentication system, such that the authentication system may be contacted to provide additional authentication factors in response to the declined authentication request. In other words, the authentication response may indicate additional authentication is required using an additional authentication system. In some embodiments, the authentication URI is specified in the authentication rules. For example, an authentication rule may include a URI of a system to contact when the rule results in declining an authentication request. For example, an authentication response may include a phone number (e.g., URI) to call, where a user may call the number from a trusted number (e.g., possession factor) and enter a PIN to confirm their identity. In another example, the authentication response may include a URL (e.g., URI) of a webserver, where a user may enter a username and password (e.g., knowledge factor) to confirm their identity. In some embodiments, the URI is associated with the AC computing device, and the additional authentication factors provided are included in a second authentication request, such that the additional authentication factors may be stored in the identity database.

The technical problems addressed by the authentication correlation computer systems and methods of the disclose include at least one of: (i) increased latency due to redundant authentications, (ii) elevated network usage due to repeated transmission of complex authentication factor data, (iii) increased hardware requirements due to duplicate authentication systems, and (iv) reduced network security due to incomplete evaluations of authentication requests.

The authentication correlation computer systems and methods of the disclose may be implemented using computer programming or engineering techniques including computer software, firmware, hardware, or any combination or techniques including computer software, computer firmware, hardware, or any combination or subset thereof, wherein the technical effects may be achieved by: (i) receiving a first authentication request from a requesting computer device including an account identifier, a first timestamp, and at least one authentication factor, (ii) determining a first security level of the first authentication request based upon the at least one authentication factor, (iii) storing the first security level and the first timestamp in a database as authentication data in a location associated with the account identifier, (iv) receiving a second authentication request including the account identifier and a second timestamp, (v) determining an authentication rule stored applies to the second authentication request based at least in part on the account identifier, the rule defining a timeframe and an authentication threshold, (vi) retrieving authentication factor data based on the timeframe, the second time stamp, and the account identifier, wherein the authentication factor data includes any number of stored security levels, (vii) comparing the stored security levels to the authentication threshold, (viii) determining an authentication response based on the comparison, wherein the authentication response includes an approval indicator, and (ix) transmitting the authentication response The resulting technical benefits achieved by the authentication correlation computer systems and methods include at least one of: (i) reduced network latency due to elimination of redundant authentications, (ii) reduced network usage due to reduced transmission of authentication factor data, (iii) enhanced network security due to reduced presence of authentication factor data in network traffic, (iv) enhanced network security due to correlation of authentication requests to multifactor authentications.

In one embodiment, a computer program is provided, and the program is embodied on a computer-readable medium. In an example embodiment, the system may be executed on a single computer system, without requiring a connection to a server computer. In a further example embodiment, the system may be run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Apple Inc. located in Cupertino, CA). In yet a further embodiment, the system is run on a Mac OS® environment (Mac OS is a registered trademark of Apple Inc. located in Cupertino, CA). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Washington). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus, are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the system and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, any type of virtual card (e.g. virtual cards generated by issuers and/or third party processors via mobile bank or desktop apps) and/or any other device that may hold payment account information, such as mobile phones, Smartphones, personal digital assistants (PDAs), key fobs, digital wallets, and/or computers. Each type of transactions card can be used as a method of payment for performing a transaction. As used herein, the term "payment account" is used generally to refer to the underlying account with the transaction card. In addition, cardholder card account behavior can include but is not limited to purchases, management activities (e.g., balance checking), bill payments, achievement of targets (meeting account balance goals, paying bills on time), and/or product registrations (e.g., mobile application downloads).

As used herein, the term "transaction data" refers to data that includes at least a portion of a cardholder's account information (e.g., cardholder name, account identifier, credit line, security code, and/or expiration data) and at least a portion of purchase information (e.g., price, a type of item and/or service, SKU number, item/service description, purchase date, and/or confirmation number) supplied by a merchant from which the cardholder is making a purchase.

FIG. 1 is a schematic diagram illustrating an example AC system 100, including payment network 150. AC computing device 160 is communicatively coupled to any number of merchant and/or user computing devices through payment network 150. In one embodiment, payment network 150 is a TCP/IP data network. In another embodiment, payment network 150 is a virtual network, such that payment network 150 is accessible over the Internet through an encrypted connection (e.g., VPN connection).

In the example embodiment, AC computing device 160 is configured to receive authentication request from merchant computing device 110, such as payment card transactions. For example, AC computing device 160 may receive an authentication request based on a payment card transaction initiated at merchant computing device 110. In the example embodiment, merchant computing device 110 transmits an authentication request to payment network 150, and AC computing device 160 receives an authentication request from payment network 150. In some embodiments, merchant computing device 110 is configured to read chip cards (e.g., EMV cards, smart cards, etc.), and generate payment card transactions.

In the example embodiment, AC computing device 160 is configured to receive authentication requests from user computing device 120, such as portal logins, and virtual payment card transactions. For example, AC computing device may receive an authentication request from user computing device 120 associated with logging into a secure web portal. In another embodiment, AC computing device may receive an authentication request from user computing device 120 associated with a virtual payment card transaction, where the payment card data is stored in secure memory component 124.

In the example embodiment, user computing device 120 includes biometric scanning component 122, such as a fingerprint reader or face-geometry camera system, and secure memory component 124, storing private key data. Biometric scanning component 122 and secure memory component 124 may be used to generate authentication factor data. For example, biometric scanning component 122 may include a virtual payment card and trusted fingerprint data. An input fingerprint from biometric scanning component 122 may be compared by user computing device 120 to the trusted fingerprint data before virtual payment card data stored in secure memory component 124 may be used.

In the example embodiment, AC computing device 160 includes a memory storing authentication rules 162 used for generating authentication responses based on authentication requests and stored authentication factor data. AC computing device 160 is configured to store authentication factor data in identity database 164. More specifically, AC computing device is configured to encode authentication factors received in authentication requests for storage as database records in identity database 164, and further to retrieve database records, including authentication factor data, from the database using queries based on account identifiers.

AC computing device 160 is configured to transmit authentication responses to authentication requests. AC computing device 160 may transmit authentication responses to merchant computing device 110 and/or user computing device 120 based on the original authentication request. In other words, AC computing device 160 may determine the destination for an authentication response based on the type of authentication request. In one embodiment, where the authentication request is a payment card transaction, the authentication response may be transmitted by AC computing device 160 to merchant computing device 110 and/or payment network 150. In another embodiment, where the authentication request is a portal login, the authentication response may be transmitted by AC computing device 160 to user computing device 120.

In the example embodiment where the authentication request is for a payment card transaction, AC computing device 160 is configured to generate the authentication response based on stored aggregated factor data. Specifically, AC computing device 160 is configured to correlate the authentication request to stored aggregated factor data, where the authentication requests and the stored aggregated factor data are associated by having the same user and/or account. In other words, AC computing device 160 approves/declines the authentication request based on authentication factors data. For example, AC computing device 160 may approve a second authentication request that includes a payment card number based on a first authentication request, included in the authentication factor data, where the first authentication request includes a payment card number and indicator of biometric verification. In other words, authentication requests having a lower security level may be approved based on previous authentication requests associated with the same account having a higher security level.

Additionally or alternatively, AC computing device 160 may include a risk-based decisioning (RBD) component that is configured to determine whether a step-up challenge or some other further authentication is needed for authenticating a second authentication request submitted on behalf of a cardholder. In other words, when a second authentication request is received from a merchant on behalf of a cardholder, AC computing device 160 may utilize the RBD component (e.g., RBD rules for authentication) to determine whether a step-up challenge is needed to further authenticate the cardholder or whether the cardholder can be authenticated using a reduced or lower security level in view of a prior authentication request that included a higher security level. These features of the AC computing device can dramatically improve the overall processing time and processing efficiencies of the payment network while reducing online fraud at the same time.

Figure 2:
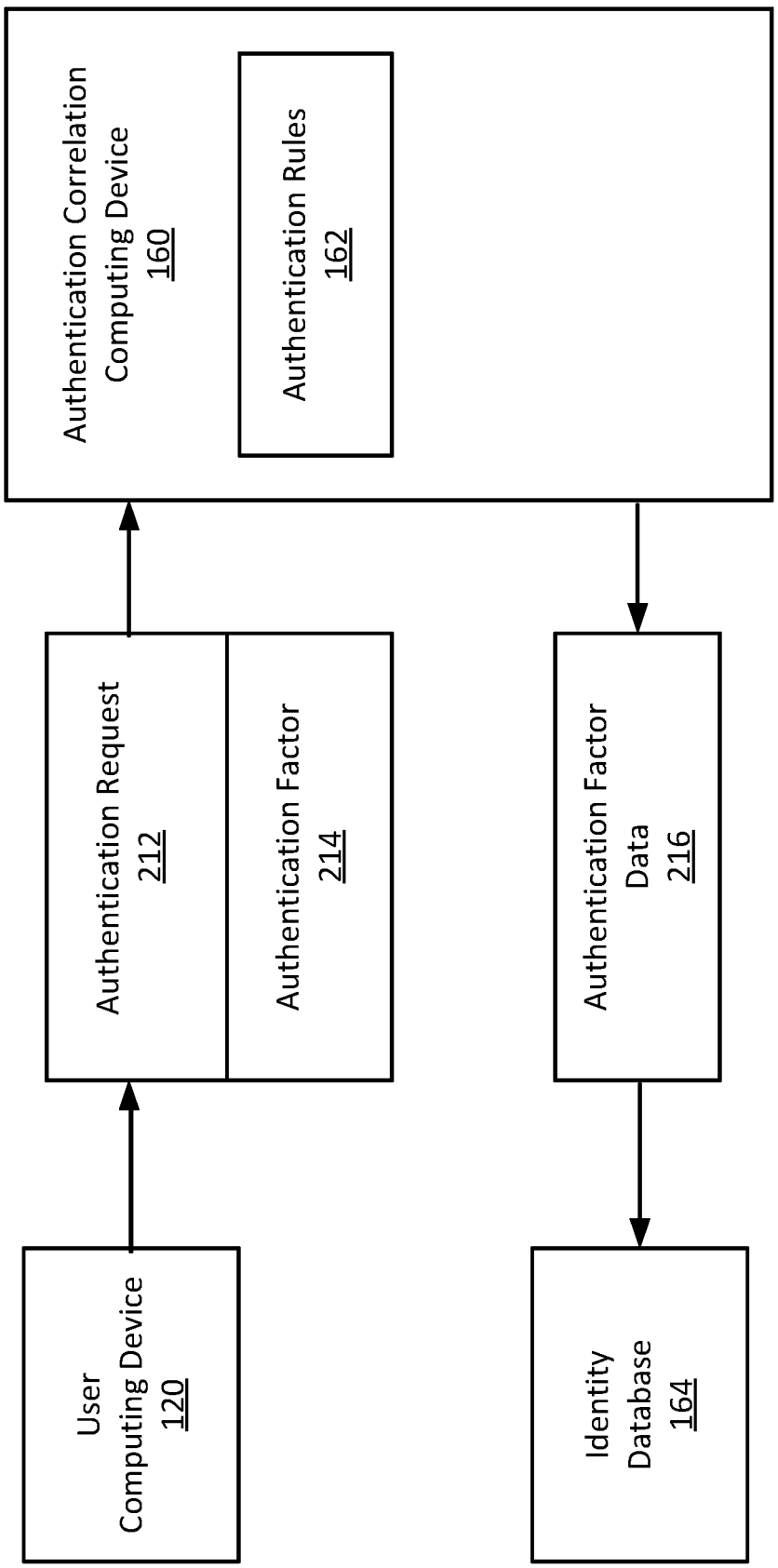
FIG. 2 is a data flow diagram illustrating an exemplary process of storing authentication factor data that may be used with the authentication correlation computer system shown in FIG. 1.

FIG. 2 is a data flow diagram of the AC system 100 (shown in FIG. 1) in an aggregation phase. AC computing device 160 receives authentication request 212, including authentication factor 214, from user computing device 120 and stores aggregated factor data 216 in identity database 164. In the example embodiment, user computing device 120 is initiating a payment using a virtual payment card stored in secure memory component 142 (shown in FIG. 1) of user computing device 120. User computing device 120 is configured to generate authentication request 212, including authentication factor 214, and transmit the request to AC computing device 160. More specifically, to generate the authentication request, user computing device 120 may be configured to scan a fingerprint using a biometric scanning component 122 (shown in FIG. 1), compare the fingerprint to a trusted representation stored in secure memory component 124, and include an indicator of the fingerprint verification (e.g., inherence factor) in authentication factor 214.

AC computing device 160 is configured to receive the authentication request, and parse (e.g., identify) the authentication factors from the authentication request. In the example embodiment, AC computing device 160 determines authentication request 212 includes an indicator of one inherence factor, and more specifically an indicator that device-level fingerprint authentication was performed. AC computing device 160 is configured to, based on authentication rules 162, store aggregated factor data 216 in identity database 164. In the example embodiment, AC computing device 160 is configured to generate instructions to create a new record in identity database 164, including the aggregated factor data 216 parsed from the received authentication factor 214, and further including the account identifier and timestamp from the associated authentication request 212. In other words, the AC computing device records the time of fingerprint authentication associated with a specific account, such that records of recent authentications may be retrieved.

AC computing device 160 is configured to aggregate and store authentication factors, such as authentication factor 214. AC computing device 160 generates aggregated factor data based on authentication factors included in authentication requests. In the example embodiment, the AC computing device stores the aggregated factor data in a database indexed by account identifiers.

Authentication request 212 may include a request to access a web portal (e.g., an authentication request) from user computing device 120, including a username and a password (e.g., authentication factor 214). Additionally or alternatively, AC computing device 160 may receive authentication request 212 from a merchant computing device including a payment card security code (e.g., an authentication factor) indicating the payment card was present for the transaction.

AC computing device 160 is configured to parse any number of authentication factors, such as authentication factor 214, from authentication request 212. Authentication factors include, at least, knowledge factors, possession factors, and inherence factors. For example, AC computing device 160 may determine authentication request 212 includes any combination of device identifiers, passwords, pin codes, biometric identifiers, device signatures, OTP values, and the like. In the example embodiment, AC computing device 160 determines authentication request 212 includes authentication factor 214, an indicator the fingerprint of the user was checked by the device (e.g., inherence factor).

AC computing device 160 determines a first security level of authentication request 212 based on authentication factor 214. The security level may include any of authentication score, a risk score, and/or a trust score. For example, authentication requests may be scored on a range from 0 to 100 based on the included authentication factors.

AC computing device 160 is further configured to determine any number of users and/or accounts associated with authentication request 212. In the example embodiment, AC computing device 160 is configured to determine an account identifier based on a payment card identifier or virtual payment card identifier included in authentication request 212.

AC computing device 160 is configured to generate and store authentication factor data 216 based on authentication request 212 and/or authentication factor 214. AC computing device 160 is configured to store parsed authentication factors (e.g., authentication factor 214) in identity database 164. In the example embodiment, AC computing device 160 generates an authentication record in response to authentication request 212, such that the result of each authentication request is stored. The authentication record may include an account identifier, a timestamp, and authentication factor data.

AC computing device 160 is configured to store authentication factor data 216 in a hashed and/or encrypted format. For example, AC computing device 160 may store a hash value of authentication factor 214, such as fingerprint data or an encrypted device identifier, such that a record of authentication factors is maintained without storing the original aggregated factor data. Additionally or alternatively, authentication factor data 216 may include indicators of the types of authentication factors received in an authentication request. For example, in response to authentication factor 214 including fingerprint data, AC computing device 160 may store a record including a timestamp, where the record indicates the user authenticated using a biometric (e.g., inherence) factor.

Figure 3:
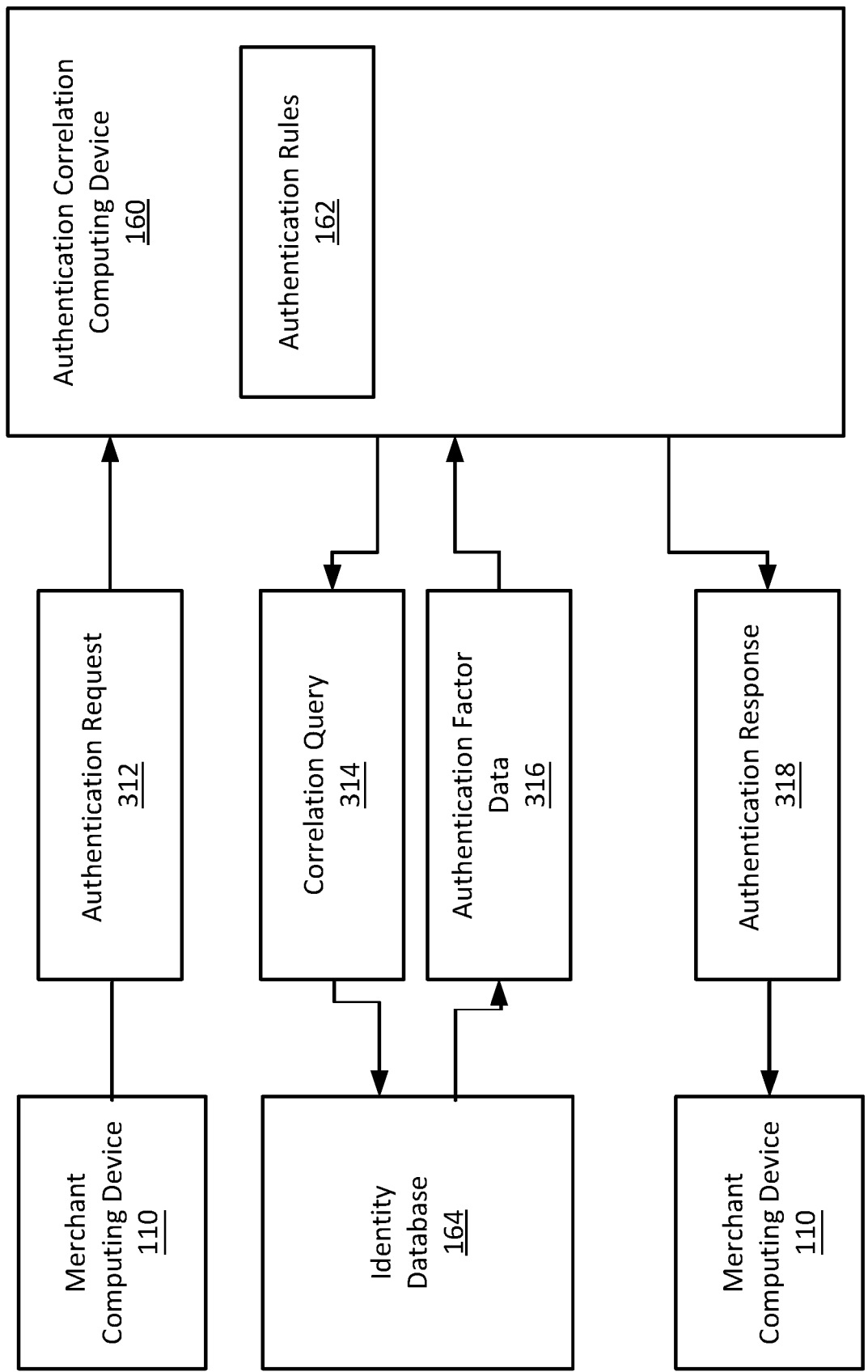
FIG. 3 is a data flow diagram illustrating an exemplary process of generating authentication responses based on authentication factor data that may be used with the authentication correlation computer system shown in FIG. 1.

FIG. 3 is a data flow diagram of the AC system 100 (shown in FIG. 1) in a correlation phase. AC computing device 160 receives authentication request 312 from merchant computing device 110. In the example embodiment, merchant computing device 110 generates authentication request 312 based on a payment card provided by a user. More specifically, authentication request 312 includes an indicator that the payment card was present when the merchant computing device 110 generated the request, and further includes an account identifier.

AC computing device 160 is configured to determine any number of authentication rules from stored authentication rules 162 match the authentication request 312 based on the included account identifier. In other words, AC computing device 160 compares authentication request 312 to stored authentication rules 162. In one embodiment, where the authentication request is a payment card transaction, AC computing device may match stored authentication rules 162 to authentication request 312 based on an issuer identification number included in the account identifier.

AC computing device 160 is configured to generate a correlation query 314, based on authentication rules 162, where the query is configured to retrieve associated aggregated factor data. In one embodiment, correlation query 314 includes SQL instructions to filter authentication factor data based on a timeframe included in authentication rules 162. More specifically, correlation query 314 may select data based on a timeframe from authentication rules 162 combined with a timestamp from authentication request 312. For example, correlation query 314 may select data having a timestamp greater than the authentication request timestamp less the timeframe. Overall, correlation query 314 is configured to select recent authentication factor data.

In certain embodiments, correlation query 314 further includes selecting data based on an account identifier included in authentication request 312. In the example embodiment, correlation query 314 includes selecting authentication factor data including the account identifier of authentication request 312. AC computing device 160 is configured to transmit correlation query 314 to identity database 164, such that aggregated factor data 316 is returned in response to the query. In other words, correlation query 314 retrieves aggregated factor data 316 from identity database 164.

AC computing device 160 generates authentication response 318 based on aggregated factor data 316 and authentication request 312. In other words, AC computing device 160 determines to approve or decline authentication request 312 based on aggregated factor data 316, and transmits the response to merchant computing device 110 as authentication response 318. In the example embodiment, the authentication rules 162 specify to approve authentication requests including a transaction amount between $1,000 and $3,000 if, and only if, a previous authentication had a high security level (e.g., fingerprint verification) within the preceding three hours. AC computing device 160 generates and transmits authentication response 318 to merchant computing device 110. Additionally or alternatively, AC computing device may transmit authentication response 318 to the payment network, potentially including a bank (e.g., issuer) associated with the account identified in the authentication request.

AC computing device 160 is configured to generate authentication response 318 based on stored aggregated factor data 316. Specifically, AC computing device 160 is configured to correlate authentication request 312 to stored aggregated factor data 316, where the authentication requests and the stored aggregated factor data are associated by having the same user and/or account. In other words, AC computing device 160 approves/declines authentication request 312 based on authentication factors data 316. For example, AC computing device 160 may approve authentication request 312 including a payment card number based on a first authentication request, included in authentication factor data 316, where the first authentication request includes a payment card number and indicator of biometric verification. In other words, authentication requests having a lower security level may be approved based on previous authentication requests associated with the same account having a higher security level.

AC computing device 160 is configured to generate authentication response 318 based on authentication rule 162, where authentication rules 162 indicate conditions for approving or declining authentication requests, such as authentication request 312. In the example embodiment, authentication rules 162 include a timeframe and a security level threshold, where the timeframe is used to limit (e.g., filter) authentication factor data 316, such that only recent authentication factors are retrieved. For example, a timeframe may include selecting authentication factor data including a stored timestamp within two hours of a received timestamp. The security level threshold includes a security level, and/or a number of security levels. For example, the security level threshold may define a minimum security level, where the security level includes a risk score, and/or the security level threshold may define a set of security levels, where the security level includes indicators of authentication types. In other words, AC computing device 160 is configurable to require different levels of authentication before approving an authentication request.

AC computing device 160 is configured to match authentication request 312 to at least one authentication rule, from authentication rules 162, based on scope specifications included in the authentication rules. In other words, AC computing device 160 determines any authentication rules applicable to an authentication request. In the example embodiment, AC computing device 160 matches authentication requests to authentication rules based on an issuer identification number ("IIN"). For example, authentication rules may be associated with a payment card issuer.

AC computing device 160 is configured to retrieve authentication factor data 316 based on authentication rules 162. More specifically, the AC computing device retrieves authentication factor data 316 based on a timeframe included in authentication rules 162, and an account identifier included in authentication request 312. In other words, the AC computing device retrieves recent authentication requests associated with the same account (e.g., payment card, web login) as the authentication request. In the example embodiment, AC computing device 160 transmits a SQL query (e.g., correlation query 314) to identity database 164, where the SQL query is configured to select authentication factor data 316 having the account identifier, and further to filter authentication factor data 316 based on the timeframe. The SQL query is also configured to return authentication factor data including any number of security levels. In other words, the AC computing device 160 retrieves recent security levels. For example, the SQL query result may indicate three authentications within the past day, one of which included fingerprint authentication.

AC computing device 160 is configured to approve authentication request 312 based on previously stored authentication factors included in authentication factor data 316. In the example embodiment, AC computing device 160 is configured to approve authentication request 312 not including an authentication factor, based on a recent authentication request included in authentication factor data 316 that included multiple authentication factors. In other words, AC computing device 160 may lower the authentication standard for authentication requests, based on authentication factors included in previous requests.

AC computing device 160 is configured to compare authentication rules 162 to authentication factor data 316 and authentication request 312, and to generate authentication response 318 based on the comparison. In other words, the AC computing device determines if authentication rules 162 are satisfied by authentication factor data 316 and authentication request 312.

Figure 4:
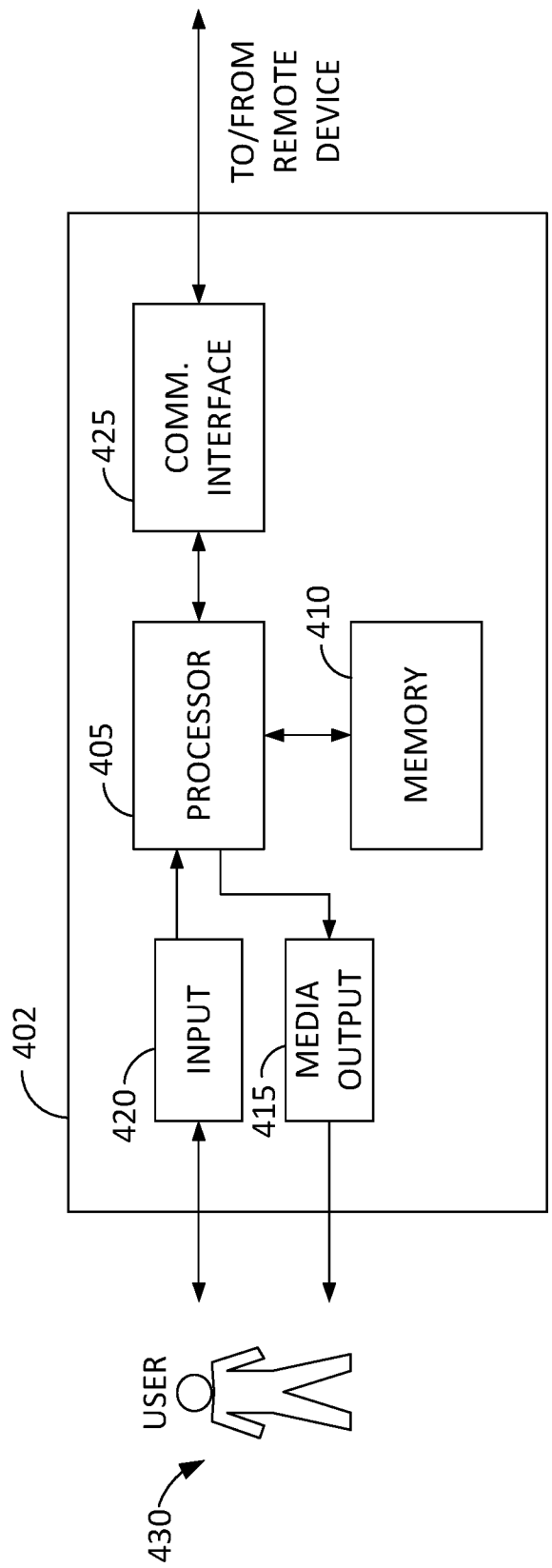
FIG. 4 illustrates an example configuration of a user device for the system shown in FIG. 1.

FIG. 4 illustrates an example configuration of a device 400 operated by a user 402, such as any of the parties described above. User device 400 may include, but is not limited to, a smart phone, a tablet, a notebook or laptop computer, a desktop computer, and a website. In the example embodiment, device 400 includes a processor 404 for executing instructions. In some embodiments, executable instructions are stored in a memory area 408. Processor 404 may include one or more processing units, for example, a multi-core configuration. Memory area 408 is any device allowing information such as executable instructions and/or written works to be stored and retrieved. Memory area 408 may include one or more computer readable media.

The device 400 may also include at least one media output component 410 for presenting information to user 402. Media output component 410 is any component capable of conveying information to user 402. In some embodiments, media output component 410 includes an output adapter such as a video adapter and/or an audio adapter. An output adapter is operatively coupled to processor 404 and operatively couplable to an output device such as a display device, a liquid crystal display (LCD), organic light emitting diode (OLED) display, or "electronic ink" display, or an audio output device, a speaker or headphones.

In some embodiments, the device 400 includes an input device 412 for receiving input from user 402. Input device 412 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 410 and input device 412. The device 400 may also include a communication interface 414, which is communicatively couplable to a remote device in the card payment system network or with other remote devices via networks other than the payment system. Communication interface 414 may include, for example, a wired or wireless network adapter or a wireless data transceiver for use with a mobile phone network, Global System for Mobile communications (GSM), 3G, or other mobile data network or Worldwide Interoperability for Microwave Access (WIMAX), or an 802.11 wireless network (WLAN).

Stored in memory area 408 are, for example, computer readable instructions for providing a user interface to user 402 via media output component 410 and, optionally, receiving and processing input from input device 412. A user interface may include, among other possibilities, a web browser and client application. Web browsers enable users, such as user 402, to display and interact with media and other information typically embedded on a web page or a website. An application allows user 402 to interact with a server application from a server system.

Multiple user devices 400 are contemplated and respectively provided for use by cardholders, representatives of the issuer, representatives of the payment processor, representatives of the merchant bank, representatives of merchants, and representatives of the AC computing device 160, and representatives of the payment network to effect the system as shown in FIG. 1. Additional and/or alternative users and user devices may be provided, however, as desired for use with the system 100.

In a variety of contemplated examples, different combinations of user devices, being the same or different from one another, may be utilized in the system with otherwise similar effect. One or more of the user devices may be a mobile device, such as any mobile device capable of interconnecting to the Internet including a smart phone, personal digital assistant (PDA), a tablet, or other web-based connectable equipment. Alternatively, one or more of the user devices may be a desktop computer or a laptop computer. Each of the user devices may be associated with a different user as described. Each user device may be interconnected to the Internet through a variety of interfaces including a network, such as a local area network (LAN) or a wide area network (WAN), dial-in connections, cable modems and special high-speed ISDN lines.

Figure 5:
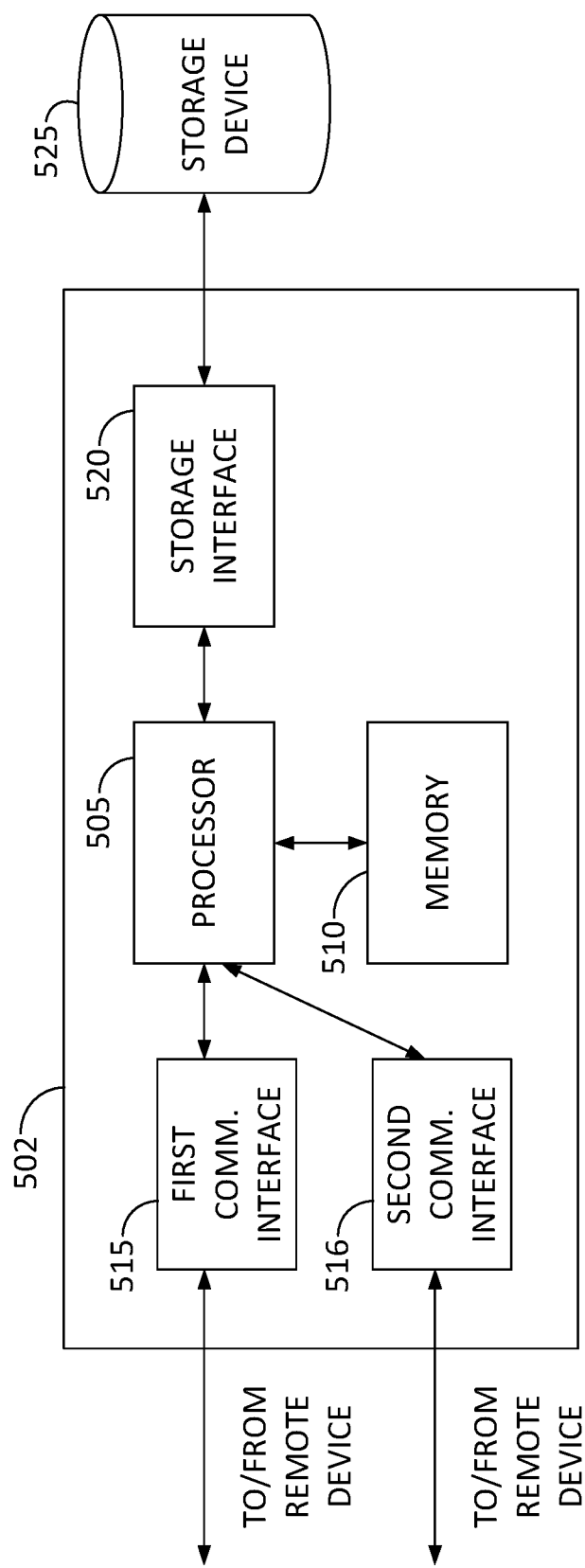
FIG. 5 is a schematic diagram of an example server computing device that maybe used with the computer system shown in FIG. 3.

FIG. 5 illustrates an example configuration of an AC computing device 500 that confers the energy transaction services described above. The computing device 500 is sometimes referred to herein as a server-based network "host" device that coordinates and manages electrical energy-based transactions and/or monetary-based transactions described above, although it is not strictly necessary in all embodiments that the host computing device is a server system.

As shown in FIG. 5, the AC computing device 500 includes a processor 504 for executing instructions. Instructions may be stored in a memory area 506, for example. Processor 504 may include one or more processing units (e.g., in a multi-core configuration).

Processor 504 is operatively coupled to a communication interface 508 such that AC device 500 is capable of communicating with a remote device such as a merchant portal, an issuing portal, an electrical provider portal, a delivery agent portal or a payment processor. For example, communication interface 508 may receive or transmit transaction data, enrolled cardholder data, enrolled merchant data, affiliate agreement data, etc. to the cardholder portal, merchant portal, a payment processor, and/or another client device via a network.

Processor 504 may also be operatively coupled to a storage device 510. Storage device 510 is any computer-operated hardware suitable for storing and/or retrieving data. In some embodiments, storage device 510 is integrated in AC computing device 500. For example, AC computing device 500 may include one or more hard disk drives as storage device 510. In other embodiments, storage device 510 is external to AC computing device 500 and may be accessed by a plurality of server computer devices. For example, storage device 510 may include multiple storage units such as hard disks or solid state disks in a redundant array of inexpensive disks (RAID) configuration. Storage device 510 may include a storage area network (SAN) and/or a network attached storage (NAS) system.

The storage device 510 may include a database server and database which contains information and transaction data for enrolled cardholders, enrolled merchants, and energy credit conversion information and data. In one embodiment, the database is centralized and stored on the server system 500. In an alternative embodiment, the database is stored remotely from the server system 500 and may be non-centralized. The database may store transaction data including data relating to merchants, merchant locations, cardholders, cardholder location, and affiliate fee agreements and accounting.

In some embodiments, processor 504 is operatively coupled to storage device 510 via a storage interface 512. Storage interface 512 is any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory area 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
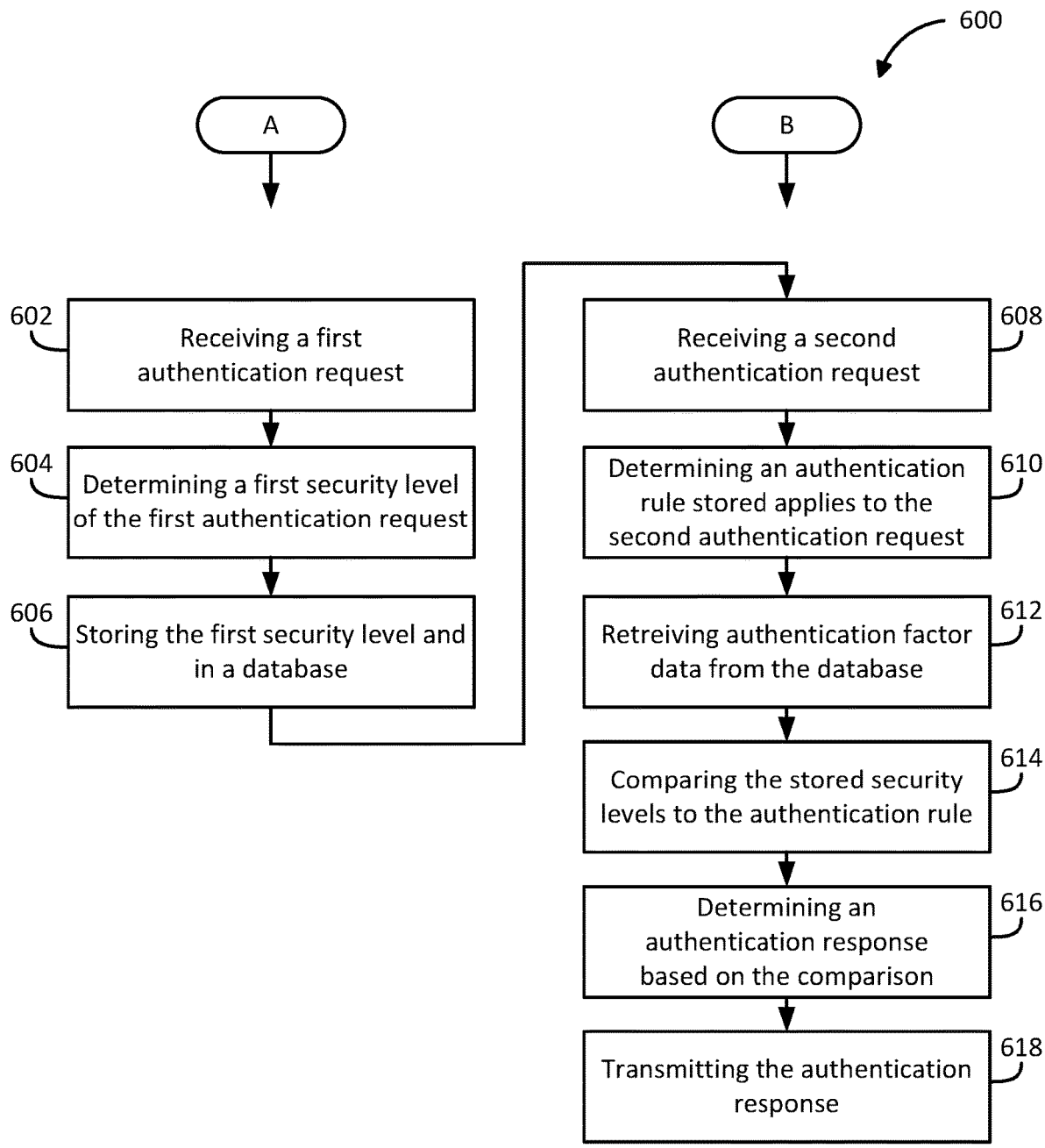
FIG. 6 shows an exemplary process for processing online user authentication requests by the system shown in FIG. 1.

FIG. 6 shows an exemplary process for processing authentication requests by the system shown in FIG. 1. Method 600 includes Step A, associated with the collection and aggregation of authentication factors. Method 600 includes receiving 602 a first authentication request from a requesting computer device including an account identifier, a first timestamp and at least one authentication factor, and determining 604 a first security level of the first authentication request based upon the at least one authentication factor. After determining the first security level, method 600 includes storing 606 the first security level and the first timestamp in a database as authentication data in a location associated with the account identifier.

Method 600 also includes Step B, associated with correlating a second authentication request to stored authentication data. Method 600 includes receiving 608 a second authentication request including the account identifier and a second timestamp, determining 610 an authentication rule stored applies to the second authentication request based at least in part on the account identifier, the authentication rule defining a timeframe and an authentication threshold, and retrieving 612 authentication factor data based on the timeframe, the second time stamp, and the account identifier. Method 600 further includes comparing 614 the stored security levels to the authentication threshold, determining 616 an authentication response based on the comparison, where the authentication response includes an approval indicator and transmitting 618 the authentication response. In one embodiment, transmitting 618 includes transmitting the authentication response to a web server providing a web portal. In another embodiment, transmitting 618 includes transmitting the authentication response to a merchant computing device, where the authentication request is associated with a payment card transaction.

As will be appreciated based on the foregoing specification, the above-described embodiments of the disclosure may be implemented using computer programming or engineering techniques including computer software, firmware, hardware or any combination or subset thereof, wherein the technical effects described above are achieved. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An authentication correlation (AC) computing device in communication with at least one secure computer network, the AC computing device comprising at least one processor and a memory, the AC computing device configured to:
   store one or more authentication rules in the memory, wherein the one or more authentication rules define a timeframe and an authentication level threshold for approval of subsequent authentication requests after a first authentication request;
   in response to a user initiating access of a first secure computer network, receive the first authentication request for the accessing of the first secure computer network, the first authentication request including a first user identifier, a first timestamp, and a first authentication factor, the first authentication factor representing a type of authentication performed in authenticating the user for accessing the first secure computer network;
   determine, based upon the first authenticator factor, a first security level of the type of authentication performed in authenticating the user as a legitimate user authorized to access the first secure computer network;
   in response to the user initiating access of a second secure computer network, receive a second authentication request for the accessing of the second secure computer network, wherein the second authentication request includes a second user identifier, a second timestamp, and a second authentication factor, and wherein the first and second user identifiers are associated with the same user;
   determine a second security level associated with the second authentication factor;
   determine whether the second security level is less secure than the first security level;
   in response to determining that (i) the second security level is less secure than the first security level, (ii) the second authentication request was received within the timeframe based on a comparison of the first and second timestamps, and (iii) the first security level satisfies the authentication level threshold, apply the one or more authentication rules to the second authentication request; and
   authenticate, based upon the application of the one or more authentication rules, the user as the legitimate user, thereby enabling access to the user to the first secure computer network and the second secure computer network without requiring additional authentication input from the user.

2. The AC computing device of claim 1, wherein the AC computing device is further configured to transmit, in response to the user being authenticated, an authentication response to at least one of the first and second secure computer networks.

3. The AC computing device of claim 2, wherein the authentication response further includes a request for additional authentication factors and a URI of a second authentication system.

4. The AC computing device of claim 1, wherein the first authentication request includes an indicator that biometric authentication was performed on a requesting user device of the user.

5. The AC computing device of claim 1, wherein the first and second authentication requests include a digital signature generated by a requesting computer device.

6. The AC computing device of claim 1, wherein the first security level and the first timestamp are stored in a location associated with the first user identifier within the memory, and wherein the AC computing device is further configured to:
   compare the second authentication request to stored aggregated factor data; and
   approve the second authentication request by matching at least some information in the second authentication request to the stored aggregated factor data.

7. The AC computing device of claim 1, wherein the AC computing device is further configured to:
   determine that the one or more authentication rules applied to the second authentication request is associated within the memory with the second user identifier for approving or declining authentication requests.

8. The AC computing device of claim 7, wherein the AC computing device is further configured to:
   retrieve authentication factor data on the timeframe, the second timestamp, and the second user identifier, wherein the authentication factor data includes any number of stored security levels; and
   compare the stored security levels to the authentication level threshold.

9. A computer-implemented method for context-based authentication, the method implemented using a authentication correlation (AC) computing device in communication with a secure computer network, the AC computing device including at least one processor and a memory in communication with the at least one processor, wherein the method comprises steps performed by the at least one processor of:
   storing one or more authentication rules in the memory, wherein the one or more authentication rules define a timeframe and an authentication level threshold for approval of subsequent authentication requests after a first authentication request;
   in response to a user initiating access of a first secure computer network, receiving the first authentication request for the accessing of the first secure computer network, the first authentication request including a first user identifier, a first timestamp, and a first authentication factor, the first authentication factor representing a type of authentication performed in authenticating the user for accessing the first secure computer network;
   determining, based upon the first authenticator factor, a first security level of the type of authentication performed in authenticating the user as a legitimate user authorized to access the first secure computer network;
   in response to the user initiating access of a second secure computer network, receiving a second authentication request for the accessing of the second secure computer network, wherein the second authentication request includes a second user identifier, a second timestamp, and a second authentication factor, and wherein the first and second user identifiers are associated with the same user;

determining a second security level associated with the second authentication factor;

determining whether the second security level is less secure than the first security level;

in response to determining that (i) the second security level is less secure than the first security level, (ii) the second authentication request was received within the timeframe based on a comparison of the first and second timestamps, and (iii) the first security level satisfies the authentication level threshold, applying the one or more authentication rules to the second authentication request; and authenticating, based upon the application of the one or more authentication rules, the user as the legitimate user, thereby enabling access to the user to the first secure computer network and the second secure computer network without requiring additional authentication input from the user.

10. The method of claim 9, further comprising:
transmitting, in response to the user being authenticated, an authentication response to at least one of the first and second secure computer networks.

11. The method of claim 10, wherein the authentication response further includes a request for additional authentication factors and a URI of a second authentication system.

12. The method of claim 9, wherein the first authentication request includes an indicator that biometric authentication was performed on a requesting computer device of the user.

13. The method of claim 9, wherein the first and second authentication requests include a digital signature generated by a requesting computer device of the user.

14. The method of claim 9, wherein the first security level and the first timestamp are stored in a location associated with the first user identifier within the memory, and wherein the method further comprises:
comparing the second authentication request to stored aggregated factor data; and
approving the second authentication request by matching at least some information in the second authentication request to the stored aggregated factor data.

15. The method of claim 9, further comprising:
determining that the one or more authentication rules applied to the second authentication request is associated within the memory with the second user identifier for approving or declining authentication requests.

16. The method claim 15, further comprising:
retrieving authentication factor data on the timeframe, the second timestamp, and the second user identifier, wherein the authentication factor data includes any number of stored security levels; and
comparing the stored security levels to the authentication level threshold.

17. A non-transitory computer readable medium that includes computer-executable instructions for context-based authentication by an authentication correlation (AC) computing device in communication with a secure computer network and having at least one processor and a memory in communication with the processor, wherein the computer-executable instructions are executable to cause the at least one processor to:
store one or more authentication rules in the memory, wherein the one or more authentication rules define a timeframe and an authentication level threshold for approval of subsequent authentication requests after a first authentication request;

in response to a user initiating access of a first secure computer network, receive the first authentication request for the accessing of the first secure computer network, the first authentication request including a first user identifier, a first timestamp, and a first authentication factor, the first authentication factor representing a type of authentication performed in authenticating the user for accessing the first secure computer network;

determine, based upon the first authenticator factor, a first security level of the type of authentication performed in authenticating the user as a legitimate user authorized to access the first secure computer network;

in response to the user initiating access of a second secure computer network, receive a second authentication request for the accessing of the second secure computer network, wherein the second authentication request includes a second user identifier, a second timestamp, and a second authentication factor, and wherein the first and second user identifiers are associated with the same user;

determine a second security level associated with the second authentication factor;

determine whether the second security level is less secure than the first security level;

in response to determining that (i) the second security level is less secure than the first security level, (ii) the second authentication request was received within the timeframe based on a comparison of the first and second timestamps, and (iii) the first security level satisfies the authentication level threshold, apply the one or more authentication rules to the second authentication request; and authenticate, based upon the application of the one or more authentication rules, the user as the legitimate user, thereby enabling access to the user to the first secure computer network and the second secure computer network without requiring additional authentication input from the user.

18. The non-transitory computer readable medium of claim 17, wherein the computer-executable instructions are further cause the at least one processor to:
transmit, in response to the user being authenticated, an authentication response to at least one of the first and second secure computer networks.

19. The non-transitory computer readable medium of claim 17, wherein the first authentication request includes an indicator that biometric authentication was performed on a requesting computer device of the user.

20. The non-transitory computer readable medium of claim 17, wherein the first and second authentication requests include a digital signature generated by a requesting computer device of the user.

* * * * *